US010070475B2

(12) United States Patent
 Zou

(10) Patent No.: US 10,070,475 B2
(45) Date of Patent: Sep. 4, 2018

(54) METHOD AND APPARATUS FOR PROVIDING ANSWER IN EMERGENCY EVENT

(71) Applicant: Telefonaktiebolaget LM Ericsson (publ), Stockholm (SE)

(72) Inventor: Hao Zou, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 83 days.

(21) Appl. No.: 15/323,562

(22) PCT Filed: Aug. 1, 2014

(86) PCT No.: PCT/CN2014/083558
§ 371 (c)(1),
(2) Date: Jan. 3, 2017

(87) PCT Pub. No.: WO2016/015337
PCT Pub. Date: Feb. 4, 2016

(65) Prior Publication Data
US 2017/0150546 A1  May 25, 2017

(51) Int. Cl.
*H04M 3/493* (2006.01)
*H04W 76/18* (2018.01)
(Continued)

(52) U.S. Cl.
CPC ......... *H04W 76/18* (2018.02); *H04M 3/5116* (2013.01); *H04W 4/023* (2013.01);
(Continued)

(58) Field of Classification Search
CPC ........... H04M 3/51; H04M 2203/1016; H04M 2242/22; H04M 3/42; H04M 3/42059;
(Continued)

(56) References Cited

U.S. PATENT DOCUMENTS 6,404,747 B1 * 6/2002 Berry ....................... H04M 3/51
370/270
6,816,878 B1 * 11/2004 Zimmers .............. G08B 27/005
340/540

(Continued)

FOREIGN PATENT DOCUMENTS

CN 102210172 A 10/2011
CN 102868966 A 1/2013
(Continued)

*Primary Examiner* — Joseph Arevalo
(74) *Attorney, Agent, or Firm* — Coats & Bennett, PLLC

(57) ABSTRACT

The disclosure provides a method (100) for providing an answer to a first User Equipment, UE, (210, 310) of a calling user in an emergency event taking place in an environment where a second UE (220, 320) of a called user resides. The method comprises: obtaining (S110) activity data in relation to the second UE (220, 320) from one or more network nodes associated with the emergency event; receiving (S120) a failure notification indicating that a call originated from the first UE (210, 310) towards the second UE (220, 320) has failed; evaluating (S130) a status of the called user based on the activity data; generating (S140) a message based on the evaluated status of the called user; and transmitting (S150) the message to the first UE (210, 310).

17 Claims, 3 Drawing Sheets

(51) Int. Cl.
*H04W 4/90* (2018.01)
*H04W 76/50* (2018.01)
*H04M 3/51* (2006.01)
*H04W 4/22* (2009.01)
*H04W 76/00* (2018.01)
*H04W 76/02* (2009.01)
*H04W 4/14* (2009.01)
*H04W 4/02* (2018.01)

(52) U.S. Cl.
CPC .............. *H04W 4/14* (2013.01); *H04W 4/22* (2013.01); *H04W 4/90* (2018.02); *H04W 76/007* (2013.01); *H04W 76/027* (2013.01); *H04W 76/50* (2018.02); *H04M 2242/04* (2013.01); *H04W 4/02* (2013.01)

(58) Field of Classification Search
CPC ......... H04W 64/00; H04W 4/02; H04W 4/10; H04W 84/04
USPC ...... 455/404.2, 436, 404.1, 566, 552.1, 428, 455/423, 457
See application file for complete search history.

(56) References Cited

U.S. PATENT DOCUMENTS

| | | | | |
|---|---|---|---|---|
| 6,993,615 | B2 * | 1/2006 | Falcon | G06F 1/1626 381/86 |
| 7,142,900 | B1 * | 11/2006 | Straub | H04B 1/38 455/404.1 |
| 2002/0055340 | A1 * | 5/2002 | Seto | G01C 21/26 455/186.1 |
| 2003/0069691 | A1 * | 4/2003 | Schroeder | G01C 21/30 701/468 |
| 2003/0129973 | A1 | 7/2003 | Oishi et al. | |
| 2004/0203672 | A1 * | 10/2004 | Crocker | H04M 3/42 455/415 |
| 2004/0203914 | A1 * | 10/2004 | Kall | H04W 8/10 455/456.1 |
| 2004/0213401 | A1 * | 10/2004 | Aupperle | H04M 1/57 379/372 |
| 2005/0124367 | A1 * | 6/2005 | Hassan | H04W 4/10 455/518 |
| 2006/0030333 | A1 * | 2/2006 | Ward | G01S 5/0205 455/456.1 |
| 2007/0003024 | A1 * | 1/2007 | Olivier | H04M 11/04 379/45 |
| 2007/0110046 | A1 * | 5/2007 | Farrell | H04L 69/04 370/389 |
| 2009/0280770 | A1 * | 11/2009 | Mahendran | H04L 29/12594 455/404.1 |
| 2011/0032931 | A1 * | 2/2011 | Zhu | H04W 76/027 370/357 |
| 2011/0264766 | A1 | 10/2011 | Ota et al. | |
| 2011/0319051 | A1 | 12/2011 | Reitnour | |
| 2012/0302199 | A1 | 11/2012 | Yamashita | |
| 2014/0038513 | A1 | 2/2014 | Gotoh et al. | |
| 2014/0248848 | A1 * | 9/2014 | Mufti | H04W 76/007 455/404.1 |
| 2014/0274225 | A1 * | 9/2014 | Lacatus | H04W 24/08 455/574 |

FOREIGN PATENT DOCUMENTS

| | | |
|---|---|---|
| CN | 103493468 A | 1/2014 |
| EP | 1142371 B1 | 3/2005 |

* cited by examiner

METHOD AND APPARATUS FOR PROVIDING ANSWER IN EMERGENCY EVENT

TECHNICAL FIELD

The disclosure relates to communication technology, and more particularly, to a method and apparatus for providing an answer to a calling user in an emergency event.

BACKGROUND

When an emergency event, e.g., a natural disaster (such as an earthquake) or a terrorist attack, occurs, telecommunication networks serving the region involved in the emergency event may become overloaded or congested due to dramatically increased network traffics, and possibly, damages to telecommunication infrastructures.

For example, users may attempt to call their relatives or friends who were possibly in that region when the emergency event occurred to confirm whether they are fine or not. However, due to a possible network congestion, the call success rate may be very low and thus many of such attempts may fail. In this case, a large number of re-attempts will be made, which makes the situation even worse.

Some solutions have been proposed for network overload protection. In one solution for example, a network or a network node can be prevented from being overloaded by simply rejecting or discarding further traffic when the load on the network or network node is higher than a predefined threshold. As another example, a telecommunication operator may broadcast messages to its subscribers, asking them to stop making calls to the region involved in the emergency event, so as to avoid network overload or congestion. However, these solutions cannot relief the anxiety of people and thus lead to a poor user experience.

There is thus a need for a technique for informing a user who has failed his/her call attempt towards a region involved in an emergency event.

SUMMARY

It is an object of the disclosure to provide a method and apparatus for providing an answer to a calling user in an emergency event, capable of improving the user's experience in case of network congestion or overload due to the emergency event.

According to an aspect of the disclosure, a method for providing an answer to a first User Equipment (UE) of a calling user in an emergency event taking place in an environment where a second UE of a called user resides is provided. The method comprises: obtaining activity data in relation to the second UE from one or more network nodes associated with the emergency event; receiving a failure notification indicating that a call originated from the first UE towards the second UE has failed; evaluating a status of the called user based on the activity data; generating a message based on the evaluated status of the called user; and transmitting the message to the first UE.

In an embodiment, the activity data is indicative of a communication-related action and/or a location of the second UE after the emergency event occurs.

In an embodiment, said evaluating comprises: evaluating whether the called user has survived the emergency event. The message is generated only when it is evaluated that the called user has survived the emergency event.

In an embodiment, it is evaluated that the called user has survived the emergency event when the activity data contains at least one data record associated with a manual action or a location change.

In an embodiment, the call is a circuit switched call and the failure notification is received from a Mobile Switching Center (MSC) associated with the emergency event.

In an embodiment, the call is a multimedia telephony call in an IP Multimedia Subsystem (IMS) network and the failure notification is received from a Call Session Control Function (CSCF) node associated with the emergency event.

In an embodiment, the activity data comprises data records associated with at least one of: incoming call, outgoing call, incoming Short Message Service (SMS) message, outgoing SMS message, data session, cell identification, location area identification, routing area identification and tracking area identification.

The disclosure also provides an apparatus for providing an answer to a first UE of a calling user in an emergency event taking place in an environment where a second UE of a called user resides as well as associated computer program and computer program storage product. The above embodiments of the method are also applicable for the apparatus, computer program and computer program storage product.

With the embodiments of the disclosure, activity data associated with the called user's UE which was served by network nodes associated with an emergency event can be obtained. Upon receiving a failure notification indicating that a call towards the called user's UE has failed, the status of the called user can be evaluated based on the obtained activity data and a message can be generated based on the evaluated status and transmitted to the calling user. In this way, even if the calling user has failed his/her call attempt towards the called user, he/she can be informed of the called user's evaluated status in a timely and efficient manner. Therefore, the user experience can be significantly improved. On the other hand, the anxiety of the calling user can be relieved and the amount of traffics due to re-attempts can be reduced, such that the scarce network resources can be used for other subscribers or reserved for high priority communications which may be critical for life saving.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 1:
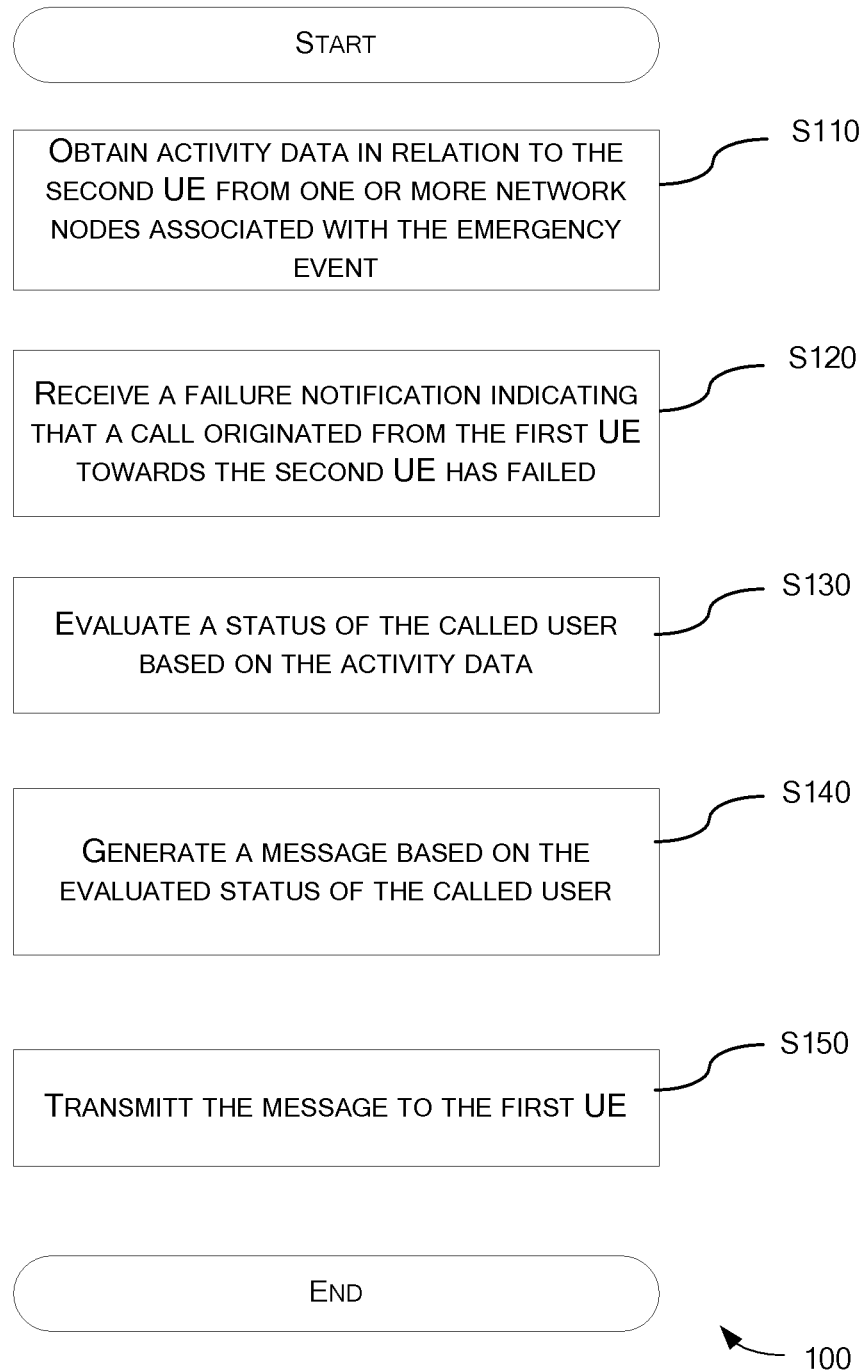
FIG. 1 is a flowchart illustrating an embodiment of method steps.

FIG. 1 is a flowchart illustrating a method 100 for providing an answer to a user equipment (UE-B) of a calling user (User B) in an emergency event taking place in an environment where a user equipment (UE-A) of a called user (User A) resides according to an embodiment of the disclosure. The method 100 can be performed at a network node, referred to as "Advanced Answer Node (AAN)" hereinafter, in a core network. The method 100 includes the following steps.

At step S110, the AAN obtains activity data in relation to UE-A from one or more network nodes associated with the emergency event.

After the emergency event occurs, a network operator is notified of a geographical region involved in, or affected by, the emergency event. For example, an emergency notification containing information on the geographical region can be sent to a network management server of the network operator by an emergency management agency. Accordingly the network operator is aware of which of its network nodes are associated with the emergency event, i.e., which of its network nodes are serving the region. Then, the network operator activates a function of collecting activity data of users in each of these network nodes. Each network node associated with the emergency event may send the activity data it collects to the AAN either periodically or at the request from the AAN. Here, UE-A was served by at least one of these network nodes. Examples of a mobile UE are a mobile phone, a smart phone, a mobile internet connected device/equipment, such as a tablet, cloths, glasses, etc.

In an embodiment, the activity data is indicative of a communication-related action and/or a location of UE-A after the emergency event occurs. In particular, the activity data can include communication-related data records associated with at least one of incoming call, outgoing call, incoming Short Message Service (SMS) message, outgoing SMS message and data session. Each of such data records may include information such as timestamp, duration and result code (e.g., call success or call failure). Alternatively or additionally, the activity data can include location-related data records associated with at least one of cell identification (ID), location area ID, routing area ID and tracking area ID.

For example, User A can be a subscriber of the $2^{nd}$ generation (2G) or the $3^{rd}$ Generation (3G) wireless network. In this case, the data records associated with incoming call, outgoing call, incoming SMS message or outgoing SMS message can be obtained from a Mobile Switching Center (MSC) and the data records associated with data session can be obtained from a Serving GPRS Supporting Node (SGSN) and/or a Gateway GPRS Support Node (GGSN). When UE-A of User A is attached to a Circuit Switched (CS) domain, the cell ID and the location area ID can be obtained from the MSC. When UE-A is attached to a Packet Switched (PS) domain, the cell ID and the routing area ID can be obtained from the SGSN.

As another example, User A can be a subscriber of the $4^{th}$ generation (4G) wireless network or an IP Multimedia Subsystem (IMS) network. In this case, the data records associated with incoming call, outgoing call, incoming SMS message or outgoing SMS message can be obtained from a Call Session Control Function (CSCF) node or a Telephony Application Server (TAS) and the data records associated with data session can be obtained from a Mobility Management Entity (MME) or a Packet Gateway (P-GW). The cell ID and the tracking area ID can also be obtained from the MME.

At step S120, the AAN receives a failure notification indicating that a call originated from UE-B towards UE-A has failed.

In an embodiment, the call can be a circuit switched call and the failure notification is received from an MSC associated with the emergency event (which will be described later in connection with FIG. 2).

Alternatively, the call can be a multimedia telephony call in an IMS network and the failure notification is received from a CSCF node associated with the emergency event (which will be described later in connection with FIG. 3).

At step S130, the AAN evaluates a status of User A, based on the activity data.

In particular, in the step S130, the AAN evaluates whether User A has survived the emergency event. Here, the AAN evaluates that User A has survived the emergency event when the activity data contains at least one data record associated with a manual action or a location change. The evaluation of the AAN in that the User A of the called UE-A has survived is an assumption or interpretation made on activity data available.

For example, the AAN can evaluate that User A has survived the emergency event when the activity data contains a data record indicating that:

User A has sent a text or voice message (e.g., SMS or Multimedia Message Service (MMS)) after the emergency event occurs;

User A has originated a voice or video call after the emergency event occurs;

User A has answered a voice or video call after the emergency event occurs; or

User A has browsed a website, played an online game or posted some message via a Social Network Service (SNS) after the emergency event occurs.

Alternatively or additionally, the AAN can evaluate that User A has survived the emergency event when the activity data contains a data record indicating that:

User A has powered on his/her UE-A after the emergency event occurs (e.g., based on an Initial Attach message that was sent by UE-A upon its power-on); and User A has changed his/her location after the emergency event occurs (e.g., based on Location Update, Routing Area Update or Tracking Area Update message that was sent by UE-A when it moved from one location area, routing area or tracking area to another).

At step S140, the AAN generates a message based on the evaluated status of User A. Then, at step S150, the AAN transmits the message to UE-B.

In an embodiment, in the step S140, the AAN generates the message when it is evaluated in the step S130 that User A has survived the emergency event. For example, when the AAN evaluates in the step S130 that User A has survived the emergency event since the activity data obtained in the step S110 contains a data record indicating that User A has sent a text message (e.g., SMS) after the emergency event occurs, the AAN can generate an SMS message like "The subscriber has sent a message after the earthquake." and send the SMS message to a SMS center for transmission to User B's UE-B. The AAN may also include the content of the text message in the SMS message. The message can alternatively be a voice message, an e-mail or a response on a website or a mobile application. The disclosure is not limited to any specific type of message generated at the AAN.

Figure 2:
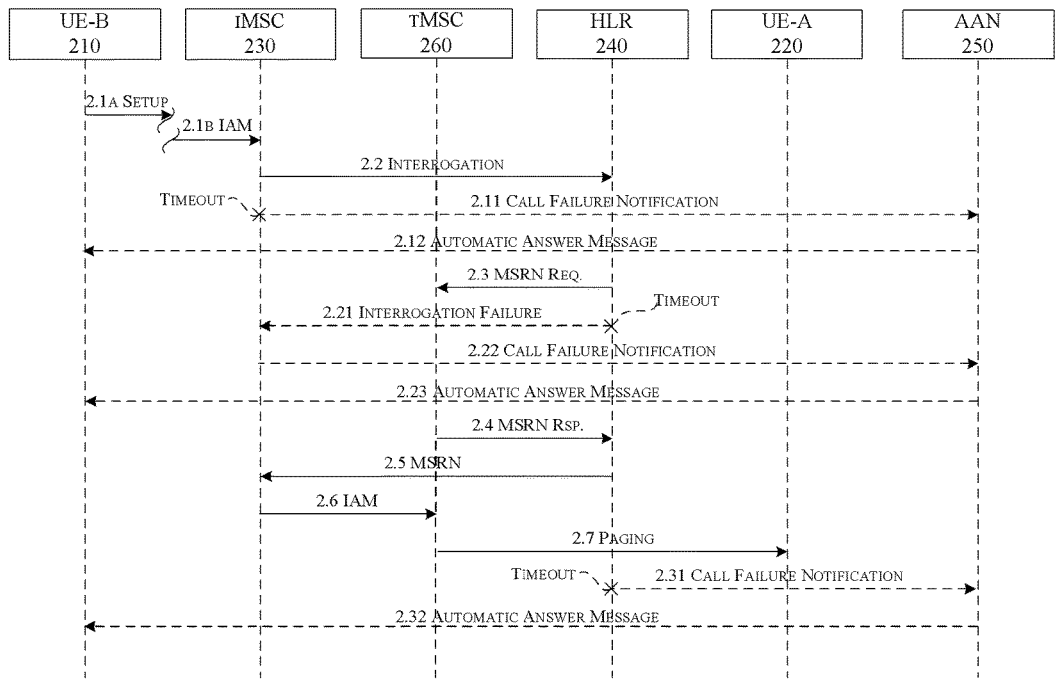
FIG. 2 is a signaling diagram illustrating an exchange of signals in an embodiment of the method of FIG. 1.

FIG. 2 is a signaling diagram illustrating a call failure scenario in the method 100 where the call is a CS voice call in a 2G/3G network for example.

As shown, at 2.1a, UE-B 210 sends a setup message for originating a voice call towards UE-A 220. After a series of intermediate processing and forwarding (which are well known to those skilled in the art and thus omitted here), at 2.1b, an interrogating MSC (iMSC) 230 associated with UE-A 220 receives an Initial Addressing Message (IAM) containing information (e.g., Mobile Subscriber Integrated Service Data Network (MSISDN) numbers) related to the calling party (UE-B 210) and the called party (UE-A 220). At 2.2, the iMSC 230 sends an interrogation message to a Home Location Register (HLR) 240 of UE-A 220 to interrogate the HLR 240 regarding which terminating MSC (tMSC) UE-A 220 is currently attached to.

If the iMSC 230 fails to receive an interrogation response from the HLR 240 within a predetermined time period (e.g., due to loss of connection between the iMSC 230 and the HLR 240), the iMSC 230 sends a failure notification to the AAN 250 at 2.11, indicating that a call originated from UE-B 210 to UE-A 220 has failed. In the failure notification, UE-B 210 and UE-A 220 can be identified by their MSISDN numbers, respectively.

On the other hand, if the connection between the iMSC 230 and the HLR 240 is functional and the HLR 240 receives the interrogation message, at 2.3, the HLR 240 sends a request for Mobile Subscriber Roaming Number (MSRN) of UE-A 220 to the tMSC 260. If the HLR 240 fails to receive an MSRN response from the tMSC 260 within a predetermined time period (e.g., due to loss of connection between the HLR 240 and the tMSC 260), at 2.21, the HLR 240 sends an interrogation failure message to the iMSC 230, which then sends a failure notification to the AAN 250 at 2.22.

On the other hand, if the connection between the HLR 240 and the tMSC 260 is functional and the tMSC 260 receives the MSRN request, at 2.4, the tMSC 260 responds to the HLR 240 with the MSRN of UE-A 220. Then, at 2.5 the HLR 240 sends the MSRN of UE-A 220 to the iMSC 230. At 2.6, the iMSC 230 sends to the tMSC 260 an IAM containing the MSRN of UE-A 220. At 2.7, the tMSC 260 pages UE-A 220. If the tMSC 260 fails to receive a paging response from UE-A 220 within a predetermined time period, the tMSC 260 sends a failure notification to the AAN 250 at 2.31.

In response to receiving the failure notification at 2.11, 2.22 or 2.31, the AAN 250 evaluates the status of User A, generates a message based on the evaluated status and sends it to UE-B 210 at 2.12, 2.23 or 2.32, as described above in connection with FIG. 1. It is to be note here that the lines between the AAN 250 and UE-B 210 at 2.12, 2.23 and 2.32 are illustrative only and do not imply that there is necessarily a direct link between them. Rather, as stated above, when the message is an SMS message, the AAN 250 sends the SMS message to the SMS center, which will in turn forward it to UE-B 210.

Figure 3:
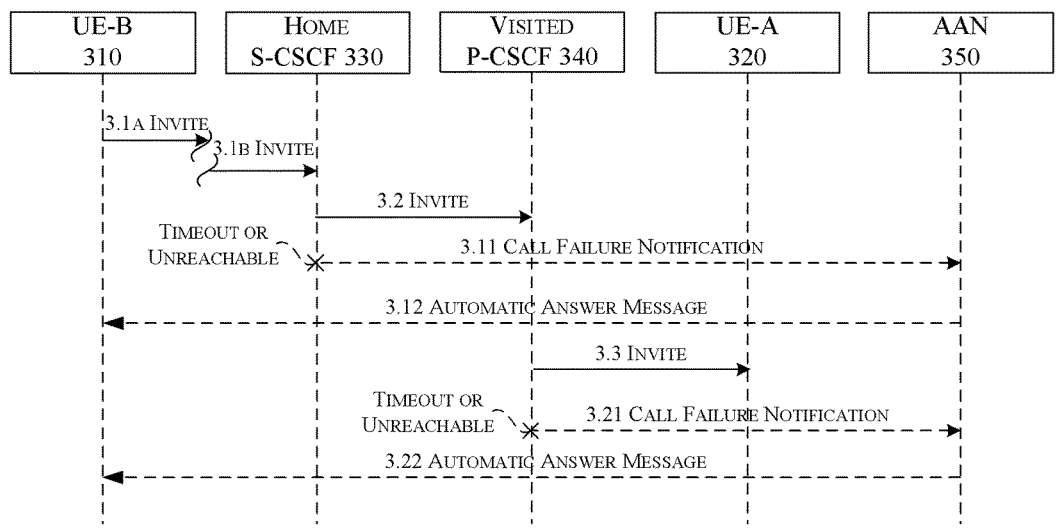
FIG. 3 is a signaling diagram illustrating an exchange of signals in an embodiment of the method of FIG. 1.

FIG. 3 is a signaling diagram illustrating another call failure scenario in the method 100 where the call is a multimedia telephony call in an IMS network for example.

As shown, at 3.1a, UE-B 310 sends a Session Initiation Protocol (SIP) Invite message for originating a voice call towards UE-A 320. After a series of intermediate processing and forwarding (which are well known to those skilled in the art and thus omitted here), at 3.1b, a home Serving Call Session Control Function (S-CSCF) 330 associated with UE-A 320 receives an Invite message containing information (e.g., IP Multimedia Public Identities (IMPUs)) related to the calling party (UE-B 310) and the called party (UE-A 320).

If the home S-CSCF 330 determines that a visited Proxy CSCF (P-CSCF) 340 associated with UE-A 320 is unreachable (e.g., the home S-CSCF 330 is aware of loss of connection between the home S-CSCF 330 and the visited P-CSCF 340), it sends a failure notification to the AAN 350 at 3.11 indicating that a call originated from UE-B 310 to UE-A 320 has failed. Alternatively, at 3.2, the home S-CSCF 330 sends an Invite message to the visited P-CSCF 340. If the home S-CSCF 330 fails to receive a response from the visited P-CSCF 340 within a predetermined time period, the home S-CSCF 330 sends a failure notification to the AAN 350 at 3.11. In the failure notification, UE-B 310 and UE-A 320 can be identified by their IMPUs, respectively.

On the other hand, if the connection between the home S-CSCF 330 and the visited P-CSCF 340 is functional, the visited P-CSCF 340 receives the Invite message. Then, if the visited P-CSCF 340 determines that UE-A 320 is unreachable (e.g., the home S-CSCF 330 is aware of loss of connection between the visited P-CSCF 340 and UE-A 320), it sends a failure notification to the AAN 350 at 3.21 indicating that a call originated from UE-B 310 to UE-A 320 has failed. Alternatively, at 3.3, the visited P-CSCF 340 sends an Invite message to UE-A 320. If the visited P-CSCF 340 fails to receive a response from UE-A 320 within a predetermined time period, the visited P-CSCF 340 sends a failure notification to the AAN 350 at 3.21.

In response to receiving the failure notification at 3.11 or 3.21, the AAN 350 evaluates the status of User A, generates a message based on the evaluated status and sends it to UE-B 310 at 3.12 or 3.22, as described above in connection with FIG. 1. Again, it is to be note here that the lines between the AAN 350 and UE-B 310 at 3.12 and 3.22 are illustrative only and do not imply that there is necessarily a direct link between them.

Figure 4:
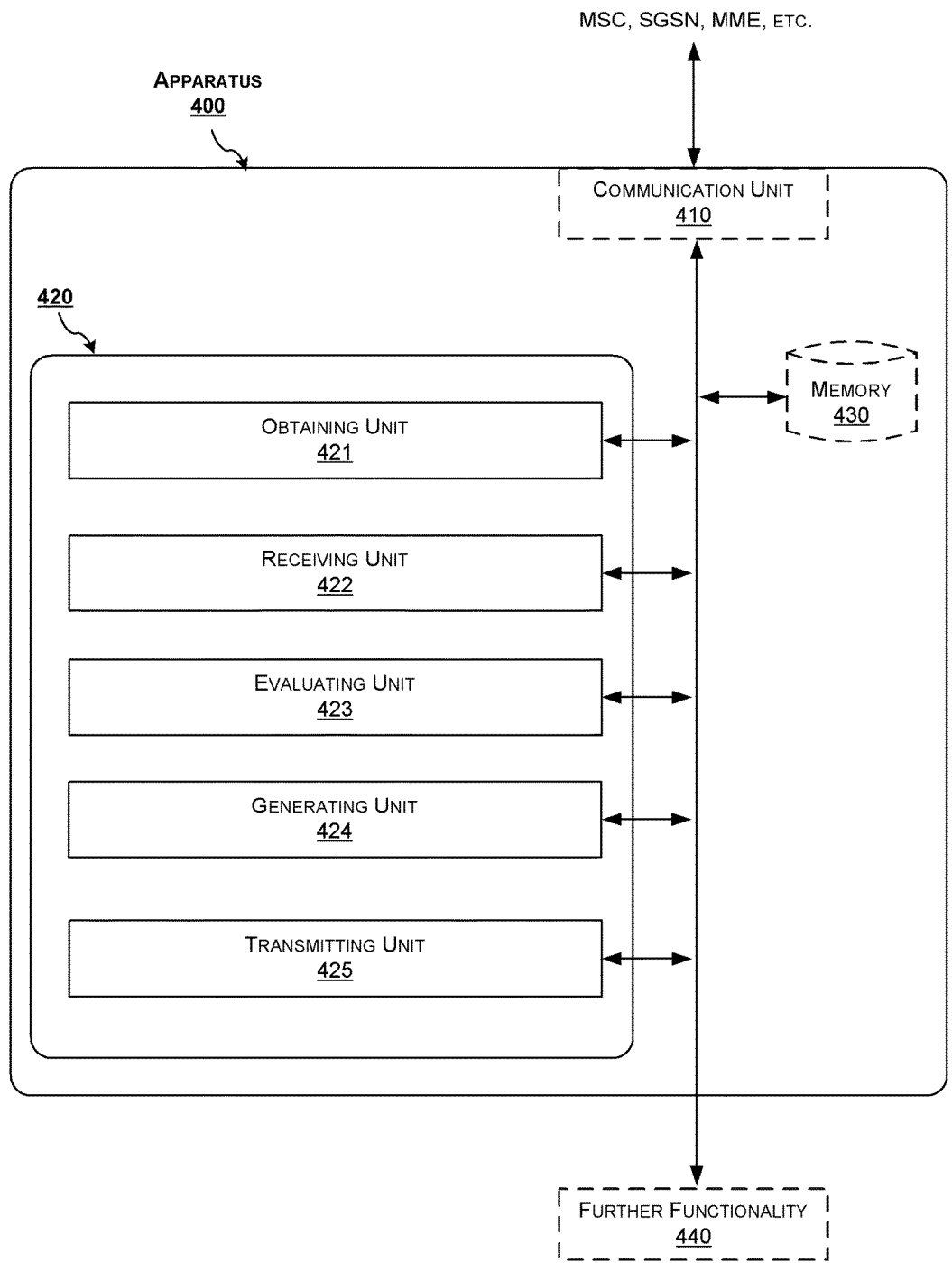
FIG. 4 is a block diagram of an embodiment of an apparatus.

FIG. 4 is a schematic diagram of an apparatus 400 for providing an answer to a first User Equipment (UE) of a calling user in an emergency event taking place in an environment where a second UE of a called user resides according to an embodiment of the disclosure. The apparatus 400 can be implemented in a core network node, such as the AAN 250 shown in FIG. 2 or the AAN 350 as shown in FIG. 3. The apparatus 400 can perform the method 100 described above with reference to FIG. 1.

As shown in FIG. 4, the apparatus 400 includes a communication unit, or transceiver, 410 for communicating with other mobile network entities or nodes such as the MSC, SGSN and MME. The apparatus 400 further includes an arrangement 420 for implementing the method described above with reference to FIG. 1. The apparatus 400 may further comprise one or more memories 430 and one or more further functional units 440.

The arrangement 420 can be implemented as a hardware solution, a software or cloud solution, or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 1.

Furthermore, the apparatus 400 may include at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor, causes the apparatus 400 to perform the actions, e.g., of the procedure described earlier in conjunction with FIG. 1.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Referring to FIG. 4, the apparatus 400 includes an obtaining unit 421 for obtaining activity data in relation to the second UE from one or more network nodes associated with the emergency event.

The apparatus 400 further includes a receiving unit 422 for receiving a failure notification indicating that a call originated from the first UE towards the second UE has failed.

The apparatus 400 further includes an evaluating unit 423 for evaluating a status of the called user based on the activity data.

The apparatus 400 further includes a generating unit 424 for generating a message based on the evaluated status of the called user.

The apparatus 400 further includes a transmitting unit 425 for transmitting the message to the first UE.

In an embodiment, the activity data is indicative of a communication-related action and/or a location of the second UE after the emergency event occurs.

In a further embodiment, the evaluating unit 423 is configured to evaluate whether the called user has survived the emergency event. The generating unit 424 is configured to generate the message only when the evaluating unit evaluates that the called user has survived the emergency event.

In a still further embodiment, the evaluating unit 423 is configured to evaluate that the called user has survived the emergency event when the activity data contains at least one data record associated with a manual action or a location change.

In a still further embodiment, the call is a circuit switched call and the receiving unit 422 is configured to receive the failure notification from a Mobile Switching Center (MSC) associated with the emergency event.

In a still further embodiment, the call is a multimedia telephony call in an IP Multimedia Subsystem (IMS) network and the receiving unit 422 is configured to receive the failure notification from a Call Session Control Function (CSCF) node associated with the emergency event.

In a still further embodiment, the activity data comprises data records associated with at least one of: incoming call, outgoing call, incoming Short Message Service (SMS) message, outgoing SMS message, data session, cell identification, location area identification, routing area identification and tracking area identification.

The method 100 and apparatus 400 presented are advantageous in that, even if the calling user has failed his/her call attempt towards the called user due to local network overload/congestion, he/she can be at least informed of the called user's evaluated status in a timely and efficient manner.

The method 100 and apparatus 400 presented are further advantageous in that, since the calling user can receive more information than a busy/congestion tone message, the anxiety of the calling user can be relieved and the amount of traffic due to re-attempts is be reduced, such that the scarce network resources can be used for other subscribers or reserved for high priority communications which may be critical for life saving.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for providing an answer to a first User Equipment (UE) of a calling user in an emergency event taking place in an environment where a second UE of a called user resides, the method executed by a network node in communication with at least the first UE and comprising:
   obtaining activity data in relation to the second UE from one or more network nodes associated with the emergency event;
   receiving a failure notification indicating that a call originated from the first UE towards the second UE has failed;
   evaluating, in response to the failure notification, a status of the called user based on the activity data;
   generating a message based on the evaluated status of the called user; and
   transmitting the message to the first UE.

2. The method of claim 1, wherein the activity data is indicative of a communication-related action and/or a location of the second UE after the emergency event occurs.

3. The method of claim 1, wherein the evaluating comprises:
   evaluating whether the called user has survived the emergency event; and
   wherein the message is generated only when it is evaluated that the called user has survived the emergency event.

4. The method of claim 3, wherein it is evaluated that the called user has survived the emergency event when the activity data contains at least one data record associated with a manual action or a location change.

5. The method of claim 1, wherein:
   the call is a circuit switched call; and
   the failure notification is received from a Mobile Switching Center (MSC) associated with the emergency event.

6. The method of claim 1, wherein:
   the call is a multimedia telephony call in an IP Multimedia Subsystem (IMS) network; and
   the failure notification is received from a Call Session Control Function (CSCF) node associated with the emergency event.

7. The method of claim 1, wherein the activity data comprises data records associated with at least one of: an incoming call, an outgoing call, an incoming Short Message Service (SMS) message, an outgoing SMS message, a data session, a cell identification, a location area identification, a routing area identification, and a tracking area identification.

8. The method of claim 1 wherein the activity data comprises at least one data record in relation to the second UE obtained by the one or more network nodes associated with the emergency event during a non-emergency data collection procedure executed after the emergency event.

9. An apparatus for providing an answer to a first User Equipment (UE) of a calling user in an emergency event taking place in an environment where a second UE of a called user resides, the apparatus in communication with at least the first UE and comprising:
processing circuitry;
memory containing instructions executable by the processing circuitry whereby the apparatus is operable to:
obtain activity data in relation to the second UE from one or more network nodes associated with the emergency event;
receive a failure notification indicating that a call originated from the first UE towards the second UE has failed;
evaluate, in response to the failure notification, a status of the called user based on the activity data;
generate a message based on the evaluated status of the called user; and
transmit the message to the first UE.

10. The apparatus of claim 9, wherein the activity data is indicative of a communication-related action and/or a location of the second UE after the emergency event occurs.

11. The apparatus of claim 9, wherein the instructions are such that:
the evaluating comprises evaluating whether the called user has survived the emergency event; and
the generating comprises generating the message only when the evaluation is that the called user has survived the emergency event.

12. The apparatus of claim 11, wherein the instructions are such that the evaluating comprises evaluating that the called user has survived the emergency event when the activity data contains at least one data record associated with a manual action or a location change.

13. The apparatus of claim 9, wherein:
the call is a circuit switched call; and
the instructions are such that the receiving the failure notification comprises receiving the failure notification from a Mobile Switching Center (MSC) associated with the emergency event.

14. The apparatus of claim 9, wherein:
the call is a multimedia telephony call in an IP Multimedia Subsystem (IMS) network; and
the instructions are such that the receiving the failure notification comprises receiving the failure notification from a Call Session Control Function (CSCF) node associated with the emergency event.

15. The apparatus of claim 9, wherein the activity data comprises data records associated with at least one of: an incoming call, an outgoing call, an incoming Short Message Service (SMS) message, an outgoing SMS message, a data session, a cell identification, a location area identification, a routing area identification, and a tracking area identification.

16. The apparatus of claim 9 wherein the activity data comprises at least one data record in relation to the second UE obtained by the one or more network nodes associated with the emergency event during a non-emergency data collection procedure executed after the emergency event.

17. A non-transitory computer readable recording medium storing a computer program product for providing an answer to a first User Equipment (UE) of a calling user in an emergency event taking place in an environment where a second UE of a called user resides, the computer program product comprising software instructions which, when run on one or more processing circuits of an apparatus, causes the apparatus to:
obtain activity data in relation to the second UE from one or more network nodes associated with the emergency event;
receive a failure notification indicating that a call originated from the first UE towards the second UE has failed;
evaluate, in response to the failure notification, a status of the called user based on the activity data;
generate a message based on the status of the called user; and
transmit the message to the first UE.

* * * * *